Patented May 23, 1950

2,508,653

UNITED STATES PATENT OFFICE 2,508,653

DI-N-SUBSTITUTED PIPERAZINE DERIVATIVES AND METHOD OF PREPARING SAME

John David Malkemus, Allendale, and John Ross, Ramsey, N. J., assignors to Colgate-Palmolive-Peet Company, Jersey City, N. J., a corporation of Delaware No Drawing. Application October 3, 1947, Serial No. 777,852

10 Claims. (Cl. 260—268)

This invention relates to a new class of compounds derived from heterocyclic nitrogen compounds of the type represented by piperazine and alkyl-substituted piperazines.

More particularly, the invention relates to a new class of compounds of the foregoing nature that are characterized by the presence in the molecule of (a) the ring structure of the heterocyclic nitrogen compound piperazine, (b) a long-chain aliphatic radical of from 6 to 24 carbon atoms and (c) two or more alkoxy groups of which at least one is attached to each of the two hetero-nitrogen atoms. Still more particularly, the invention relates to a new class of compounds that are derivatives of piperazine or an alkyl-substituted piperazine, further characterized by the presence of two side-chain substituents at the hetero-nitrogen atoms, one such substituent including a long-chain aliphatic radical of from 6 to 24 carbon atoms and at least one alkoxy radical, such as ethoxy, and the other side-chain substituent consisting of an alkoxy radical, such as ethoxy, the terminal oxygen atom of which is attached to a short-chain acyl or short-chain alkyl radical, the length of the short chain varying from one to three carbon atoms.

The invention further relates to a new class of compounds having excellent foaming, deterging, wetting and lime-soap-dispersing properties.

The invention also relates to processes for preparing compounds of the foregoing nature.

It is an object of the present invention to provide a new class of compounds having enhanced surface activity for many industrial uses where surface-active compounds are required.

It is a further object of the invention to provide a new class of compounds having surface-active properties characterized in that they are derivatives of a heterocyclic nitrogen compound of the class consisting of piperazine and alkyl-substituted piperazines in which one of the hetero-nitrogen atoms has attached thereto a side chain including at least one alkoxy radical, such as ethoxy, and a long-chain ($C_6$ to $C_{24}$) aliphatic radical, and in which the remaining hetero-nitrogen atom of the piperazine nucleus has attached thereto an alkoxy radical, such as ethoxy, the terminal oxygen atom of which is attached to a short-chain alkyl or a short-chain acyl radical, the length of the short chain varying from one to three carbon atoms.

The manner in which these and other objects of the invention are achieved will become apparent from the following description.

In accordance with the present invention it has been discovered that a new class of compounds useful as intermediates and as foaming, deterging, wetting and lime-soap-dispersing agents may be obtained by suitable syntheses to be described more fully hereinafter, employing as starting materials (1) either (a) a relatively high molecular weight fatty acid (R.COOH) having from 6 to 24 carbon atoms, and preferably a fatty acid having from 12 to 18 carbon atoms, the acid being saturated or unsaturated and with or without substituents such as hydroxyl, etc., or (b) a relatively high molecular weight aliphatic halide (R.X) having from 6 to 24 carbon atoms, and preferably having from 12 to 18 carbon atoms, the aliphatic portion being saturated or unsaturated and with or without substituents such as hydroxyl, etc., (2) a convenient source of an alkoxy radical such as ethylene oxide, and (3) piperazine or an alkyl-substituted piperazine in which the alkyl substituents are preferably of not more than two carbon atoms.

The novel compounds that are obtained in accordance with the present invention in its broadest aspects fall in the class represented by the following general structural formula:

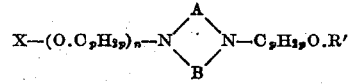

where X is selected from the class consisting of R and R.CO; A and B are selected from the class consisting of unsubstituted ethylene radicals and ethylene radicals having from one to four short-chain alkyl substituents of not more than two carbon atoms each; R is a long-chain aliphatic radical such that the carbon atom content of X varies from 6 to 24 carbon atoms, and preferably from 12 to 18 carbon atoms; R' is selected from the class consisting of short-chain alkyl and short-chain acyl radicals, the length of the short chain varying from one to three carbon atoms; $n$ is a small whole number varying from 1 to 9; and $p$ is a small whole number at least 2, and preferably varying from 2 to 4.

A preferred class of novel compounds within the general class set forth above is represented by those compounds containing ethoxy radicals in the side-chain substituents and having no alkyl substituents attached to any of the ring carbon atoms, and corresponding to the following general structural formula:

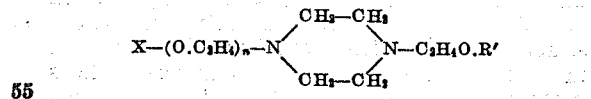

where the various letters have the same meanings as in the immediately preceding formula.

While the foregoing structural formulae aptly represent the general class of compounds with which in its broadest aspects the present invention is concerned, it may also be found convenient to consider the various new compounds that are comprehended within the scope of the present invention as falling within the following two sub-classes of compounds, corresponding respectively to long-chain ester and ether derivatives of piperazine or alkyl-substituted piperazine, respectively. For simplicity these formulae are confined to those compounds containing ethoxy $$(-O.C_2H_4-)$$

radicals, it being understood however that alkoxy compounds broadly are contemplated:

Ia $\quad$ R.CO(OC$_2$H$_4$)$_n$N(C$_2$H$_4$)$_2$N.C$_2$H$_4$.O.R'
Ib $\quad$ R(OC$_2$H$_4$)$_n$N(C$_2$H$_4$)$_2$N.C$_2$H$_4$.O.R'

In each of the foregoing formulae R, R' and n have the same meanings as before, it being understood that R is a long-chain aliphatic radical such that the carbon content of the entire radical (i. e., R.CO— and R—, respectively) attached to the terminal ethoxy radical varies from 6 to 24 carbon atoms, and preferably from 12 to 18 carbon atoms.

It will be noted that Formula Ia represents a long-chain fatty acid ester derivative of piperazine wherein the long-chain acyl radical is separated from the heterocyclic nitrogen ring structure by at least one ethoxy radical, whereas Formula Ib represents a long-chain aliphatic ether derivative of piperazine in which the long-chain aliphatic radical is similarly separated from the heterocyclic nitrogen ring structure by at least one ethoxy radical. Furthermore, in each case the second hetero-nitrogen atom of the piperazine nucleus carries as a substituent a short-chain acyl or alkyl substituent of from one to three carbon atoms, the latter substituent being separated from the hetero-nitrogen atom by a single ethoxy radical.

Before discussing suitable methods of syntheses for the compounds disclosed, it may be well to point out at this stage of the description that the value of n in the preceding formulae is preferably so chosen as to bring about a desired degree of hydrophilic and hydrophobic properties of the resulting molecule, depending upon the intended use for the given compound. In other words, it is readily possible so to adjust the value of n that the resulting compound will show affinities toward both aqueous liquids and oily liquids. Under certain circumstances it may be desirable to produce a specific compound whose affinity for aqueous liquids materially exceeds its affinity for oily liquids, or conversely. For example, many ore flotation processes require flotation agents or assistants possessing definite properties as regards their respective affinities toward aqueous and oily components, depending for example upon factors such as the nature of the ore undergoing treatment and the particular ingredients thereof being recovered. Also in the treatment of textile materials, such factors as the nature of the textile fibres being treated as well as the presence of other ingredients of the treating composition may render it desirable to produce compounds in accordance with the present invention having desirable surface-active properties, as determined in part by the total number of alkoxy radicals present in the side chains. Accordingly, the ability readily to produce compounds of desirable surface-active properties to fit the requirements of any particular use or class of uses is one of the desirable features of the present invention.

In making the long-chain fatty acid ester derivatives of piperazine in accordance with the present invention, a wide variety of carboxylic acids may be employed as starting material. For example, suitable carboxylic acids include lauric acid, myristic acid, palmitic acid, stearic acid, hydroxy-stearic acid, oleic acid, ricinoleic acid, lauryl succinic acid, caprylic acid, isocaprylic acid, caproic acid, undecylenic acid, linoleic acid, linolenic acid, lignoceric acid, erucic acid, chloropalmitic acid, mixed coconut oil fatty acids, mixed tallow fatty acids, mixtures of any of these acids, etc. Acid halides, particularly the acid chlorides of the foregoing acids are also suitable. On the other hand, the anhydrides of these acids may be employed if desired. Similarly, lower alkyl esters of any of these acids (that is, esters of alcohols having from one to about six carbon atoms, such esters including methyl, ethyl, propyl and isopropyl esters, etc.), may also be employed to form the desired long-chain ester derivatives by an alcoholysis-type reaction. Also the chlorides, bromides and iodides of the aliphatic compounds corresponding to these acids may be employed in order to provide the corresponding ethers of the present invention; to mention only a few of the suitable alkyl halides by way of example: dodecyl, tetradecyl, hexadecyl, octadecyl, hydroxyoctadecyl, Δ9-octadecenyl (corresponding to oleiyl alcohol), Δ9,12-octadecadienyl (corresponding to linoleyl alcohol), Δ9,12,15-octadecatrienyl (corresponding to linolenyl alcohol), 12-hydroxy-Δ9-octadecenyl (corresponding to ricinoleyl alcohol), hexyl, iso-octyl, etc.

The compounds according to the present invention may be prepared as follows, reference being made for the sake of simplicity to the preparation of derivatives of piperazine containing no substituents in the heterocyclic ring other than at the hetero-nitrogen atoms.

Piperazine is reacted with one molecular equivalent of ethylene oxide to yield monoethanol piperazine in accordance with the following reaction:

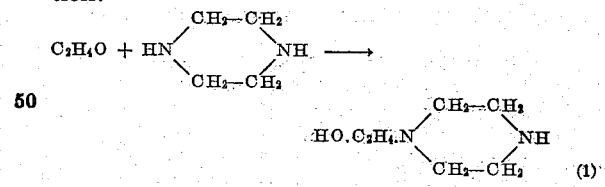

(1)

The monoethanol piperazine is then reacted with a haloalkyl ether or ester wherein the halogen atom is attached to a terminal carbon atom of the alkyl radical (i. e., in the general case, Hal.C$_p$H$_{2p}$.O.R', R' being a short chain acyl or alkyl group of from one to three carbon atoms, p representing a small whole number varying from 2 to 4, and Hal. representing a halogen atom selected from the class consisting of chlorine, bromine and iodine; and in the more specific case under discussion, with a compound having the formula Hal.C$_2$H$_4$.O.R', R' and Hal. having the same significance as before, to give a derivative of piperazine in accordance with the following reaction:

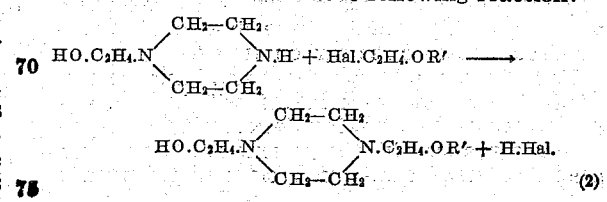

(2)

In cases where $n$ of the general formulae set forth above is to have a value in excess of one, the product of Equation 2 is then reacted with a further quantity of ethylene oxide gas at an elevated temperature in order to introduce a plurality of ethoxy radicals into the molecule. The reaction is preferably carried out at an elevated temperature such as the order of approximately 150° C. and under superatmospheric pressure, the particular superatmospheric pressure in any given instance being determined principally by factors such as the quantity of ethylene oxide in the system, the course of the reaction, the volume of the reaction system, and the temperature at which reaction takes place. Superatmospheric pressures autogenously induced in the reaction system are satisfactory. In accordance with the foregoing reaction additional ethoxy radicals are introduced into the molecule as shown by the following reaction:

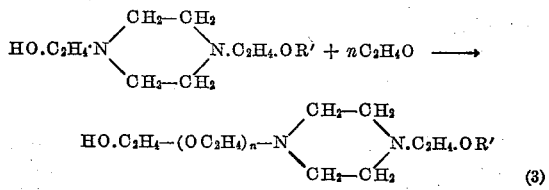
(3)

It will be understood that the reaction product actually obtained may contain minor amounts of the corresponding derivatives containing more and fewer ethoxy radicals respectively, the formula given however being representative of the statistical average. The reaction product thus obtained is then reacted with a long-chain fatty acid, R.COOH, in order to produce a final ester product conforming structurally to formula I$a$ above:

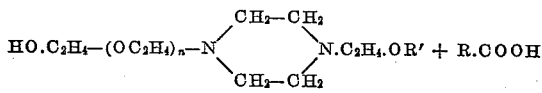

However, instead of carrying out the esterification by means of a long-chain fatty acid, R.COOH, as indicated above, one may employ at this point a lower alkyl ester of the desired long-chain fatty acid, R.COO.alk., where alk. represents an alkyl radical of from one to three carbon atoms, in an alcoholysis-type reaction in the presence of a small amount (varying from traces up to approximately 2% by weight of the combined reactants) of a catalyst comprising a caustic alkali, such as NaOH, this reaction proceeding as follows:

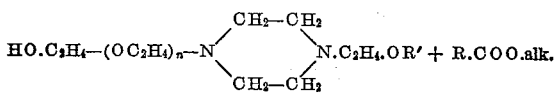

When R' is a short-chain alkyl group, Reaction 4$a$ takes place readily and in a straightforward manner; however when R' is a short-chain acyl group, complications may be introduced in that side reactions tend to occur with diminution of yield of the desired product, hence it is generally preferred (when R' is a short-chain acyl group) to employ other methods to obtain the unsymmetrical diester.

Alternatively, the esterification may be effected with the use of a long-chain acid halide, R.CO.X, or a long-chain acid anhydride, R.CO.O.OC.R if desired, in which case the esterification of course produces also H.X and R.COOH, respectively.

In case it is desired to produce the corresponding ether derivative shown in Formula I$b$ instead of the ester derivative of Formula I$a$, then the reaction product obtained from Reaction 3 having a terminal alcoholic OH group is reacted with an alkali metal such as sodium to produce the corresponding sodyl derivative as follows:

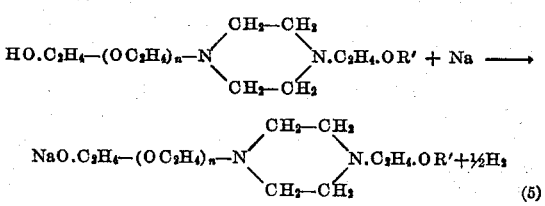
(5)

The reaction product thus obtained is then treated with a long-chain aliphatic halide, R.X, in order to produce the desired ether compound in accordance with the following reaction:

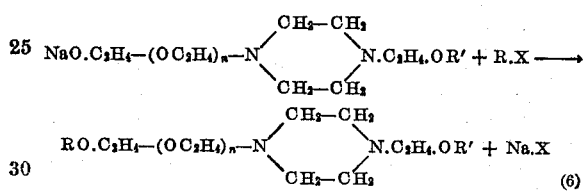
(6)

In general, it is ordinarily preferred to employ substantially the stoichiometric ratios of the reactants indicated by the foregoing equations. However, considerable departure from these ratios can be tolerated in many instances without serious detriment to either yields or quality of product. In connection with the reaction illustrated above as Reaction 1, however, (4)

if one resorts to the use of other than substantially stoichiometric ratios of reactants it is ordinarily preferred to modify this ratio in the direction of providing an excess of piperazine, thereby decreasing the yield of undesired by-products such as diethanol piperazine. Similarly when conducting the reactions indicated above by Equations 4, 4$a$, 5 and 6, it is preferred to depart if at all from the use of substantially stoichiometric ratios of reactants in the direction of insuring the presence of an excess of the pipera-

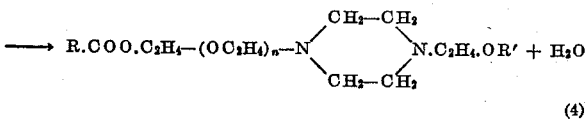

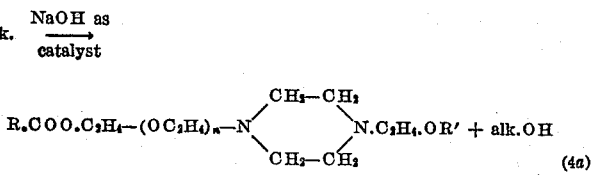
(4$a$)

zine derivative in the reaction system. Thus ratios of about one to five mols of piperazine or piperazine derivative for each mol of other reactant in accordance with each of Reactions 1, 4, 4$a$, 5 and 6 represent desirable procedure in most instances.

The long-chain aliphatic ester and ether derivatives prepared according to the present invention possess very desirable surface-active properties. They are excellent detergents and are also valuable as wetting, foaming and lime-soap-dispersing agents. They may be used either alone or in combination with many other surface-active materials, such as soaps and/or other synthetic surface-active compounds of the type of sulphated and/or sulphonated organic compounds, especially when employed in a neutral or alkaline environment. In fact, certain of the compounds of the present invention, when employed in conjunction with anionic surface-active agents, especially in neutral or alkaline solutions, enhance considerably the detersive efficiencies of the latter, thus exhibiting positive synergistic action.

The novel compounds described herein exhibit desirable surface-active properties in both acid and alkaline media, although they appear to change in character from a cationic active form to a non-ionized or an anionic form, depending upon the pH of the environment in which they are employed.

The novel compounds contemplated as falling within the scope of the present invention may be made up in dilute or concentrated aqueous solution, with or without the presence of a substantial content of a low molecular weight alcohol such as ethyl alcohol, or they may be made into a dry or partially hydrated solid product, depending upon economical or other considerations. Adjuvant materials may be admixed with these compounds to form flakes, granular particles, cakes, pastes or other physical forms of the mixture, or such adjuvant materials may be added to aqueous or other solutions of the compound. Such adjuvant materials may include sodium chloride, sodium sulphate, sodium pyrophosphate, as well as other builders and/or fillers employed in the soap and synthetic detergent arts generally, care being taken to avoid the use of any additives which would substantially diminish the effectiveness of the resulting composition. Those skilled in the art will of course appreciate that the type of addition agent to be employed depends at least in part upon the ultimate use to which the product is to be put.

The properties of the specific compounds of the present invention vary to some degree, depending upon the particular starting materials from which they are prepared, but all are surface-active agents having valuable wetting, deterging, emulsifying, softening, foaming and lime-soap-dispersing properties. They are suitable for use as assistants in the textile and related industries where they may be employed for softening fabrics, fixing colors, removing grease and oil, penetrating, etc. They are also of use in the ore flotation art as addition agents to the ore treating baths employed for separating various constituents of ores. They are also of value in the cosmetic industry as emulsifying agents and for stabilizing emulsions.

In order to indicate even more fully the nature of the present invention, the following examples of typical procedure are set forth, it being understood that these examples are presented as illustrative only and they are not intended to limit the scope of the invention. The parts given are parts by weight unless otherwise indicated.

*Example Ia*

A solution of piperazine and alcohol is prepared containing 344 parts of anhydrous piperazine in 500 parts of methyl alcohol and the solution is heated to boiling in a vessel fitted with a reflux condenser. Ethylene oxide gas is passed into the mixture under reflux until 156 parts have been absorbed. The resulting reaction mixture is then distilled under substantially atmospheric pressure, and then under reduced pressure while slowly passing a stream of an inert gas, such as nitrogen, through the apparatus. About 220 parts of monoethanol piperazine (a viscous oil; $n_D^{25}$ 1.5050) are collected at 125°–127° C. at an absolute pressure of 12 mm. of mercury.

130 parts of the monoethanol piperazine are then admixed with 150 parts (a substantially equimolar proportion) of beta-bromoethyl-ethyl ether in 500 parts ethyl-alcohol and the solution is refluxed for ten hours. After removing the major part of the solvent by distillation the residue is made alkaline with 10% sodium hydroxide and then extracted with ethyl-ether, the ethyl-ether solution being washed with small portions of sodium hydroxide solution and dried over potassium carbonate. After removing the solvent by evaporation there is obtained the monoethyl ether of N,N'-diethanol piperazine having the formula:

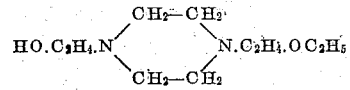

1080 parts of this product plus one part sodium are then placed in a stainless steel bomb, the air in the vessel is removed by exhaustion and replaced with nitrogen and then the apparatus is evacuated to a pressure (absolute) of about 5 mm. of mercury. Ethylene oxide gas is then intermittently passed into the mixture, heated to about 160° C. and held at this temperature for about 10 hours or until a total of about 440 parts of ethylene oxide have reacted. The reaction product contains a substantial proportion of

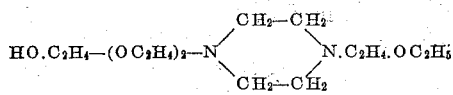

N-ethoxy-ethoxy-ethanol-N'-ethylethoxypiperazine.

Upon reacting this last-mentioned product (at 160 to 180° C., finally under diminished pressure) with a mixture of coco fatty acids having an average composition represented by the formula $C_{11}H_{23}.COOH$ (lauric acid), in the ratio of 290 parts of the former to 200 parts of the latter, there is obtained a mixture of coco fatty acid ester derivatives of piperazine corresponding in average composition, as regards the number of carbon atoms in the fatty acid ester portion thereof, to the formula:

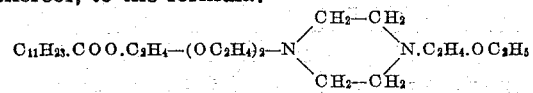

*Example Ib*

In order to produce the corresponding long-chain aliphatic ether derivatives, 300 parts of the reaction product obtained according to the Example Ia procedure as a result of the introduction of two mols of ethylene oxide (i. e., the reaction product of Equation 3 where R' is ethyl and n is 2) are reacted with 23 parts of metallic sodium in the presence of refluxing anhydrous dioxane to form the corresponding sodium derivative having the formula:

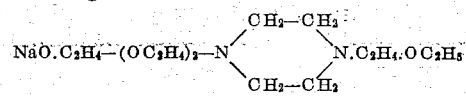

312 parts of this sodium derivative are then reacted with 205 parts of a mixture of long-chain alkyl chlorides corresponding to that obtained by the catalytic reduction (hydrogenation) of mixed coco fatty acids to the corresponding alcohols, followed by the conversion of the latter to the corresponding chlorides, the formula of the mixture being represented by $C_{12}H_{25}.Cl$ (lauryl chloride) as regards the average composition thereof. This results in the production of the corresponding coco fatty alkyl (lauryl) ether derivatives of piperazine having the formula:

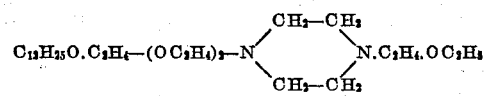

Examples IIa and IIb

The procedures of Examples Ia and Ib are repeated, except that the monoethanol piperazine is initially reacted with a substantially equimolar proportion of beta-bromo-ethyl acetate instead of with beta-bromoethyl-ethyl ether. The resulting products are obtained in good yields and correspond respectively to those indicated by Formulae Ia and Ib above, wherein R is a $C_{12}$ radical (acyl and alkyl, respectively) corresponding to the acids and alcohols derived from coco fatty acids, R' is the acetyl radical, and n is 3. In these cases, therefore, the resulting compounds of Formula Ia are characterized by the presence of two terminal ester linkages (one long-chain and one short-chain) while the resulting compounds of Formula Ib are characterized by the presence of one terminal short-chain ester linkage and one terminal long-chain ether linkage.

In order to show typical ways in which compounds of the foregoing type may be employed, the following examples are set forth:

Example A

Two parts of the coco fatty acid ester ether derivative of piperazine obtained according to the procedure of Example Ia above, are dispersed in 198 parts of water to give a 1% aqueous dispersion of the product. 1 cc. of this dispersion, when added to 10 cc. of water, gives a turbid solution that foams well on agitation, and portions thereof added to acid and to alkaline solutions, followed by adjusting the solutions to pH's of 3.5 and 9.5, respectively, result in the production of dilute aqueous solutions which give generous quantities of foam, and which show good detersive efficiencies, when used in water having about 300 parts per million of hardness calculated as calcium carbonate. The detersive efficiencies of these solutions are of the same order of magnitude in both acid and alkaline media; all reduce the surface tension of water markedly.

Example B

One part of the lauryl polyether derivative of piperazine obtained as in Example Ib above, is dissolved in 99 parts of water to give a 1% aqueous dispersion. 1 cc. of this dispersion, when added to 10 cc. of water, yields a mixture that shows excellent foaming and detersive characteristics in both acid and alkaline solutions (pH 4.5 and 8.5, respectively), in the presence of water showing a hardness of about 250 parts per million calculated as calcium carbonate.

Examples C and D

1% aqueous dispersions of the products obtained by the procedures of Examples IIa and IIb above, when made up into aqueous solutions having pH's of 4.0 and 9.0 display foaming and detersive characteristics that are of the same order of magnitude as those of the products of Examples Ia and Ib.

While various specific examples of preferred compositions and methods embodying the present invention have been described above, it will be apparent that many changes and modifications may be made in the methods of procedure and that a wide variety of specific reagents may be employed in carrying out the procedure. It should therefore be understood that the examples cited and the particular proportions, methods of procedure and compounds set forth above are intended to be illustrative only and are not intended to limit the scope of the invention.

What is claimed is:

1. A piperazine derivative having the following structural formula:

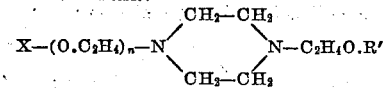

where X is selected from the class consisting of R and R.CO; R is a long-chain aliphatic radical such that the carbon atom content of X varies from 6 to 24 carbon atoms; R' is selected from the class consisting of short-chain alkyl and short-chain acyl radicals; and n is a small whole number varying from 1 to 9.

2. A piperazine derivative having the following structural formula:

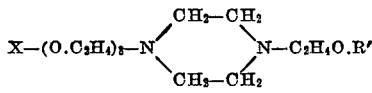

where X is selected from the class consisting of R and R.CO; R is a long-chain aliphatic radical such that the carbon atom content of X varies from 6 to 24 carbon atoms; and R' is selected from the class consisting of short-chain alkyl and short-chain acyl radicals.

3. A piperazine derivative having the following structural formula:

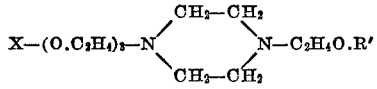

where X is selected from the class consisting of R and R.CO; R is a long-chain aliphatic radical such that the carbon atom content of X varies from 6 to 24 carbon atoms; and R' is selected from the class consisting of short-chain alkyl and short-chain acyl radicals, the length of the short chain varying from 1 to 3 carbon atoms.

4. A process for preparing surface-active compounds which comprises reacting (a) a compound having the following structural formula:

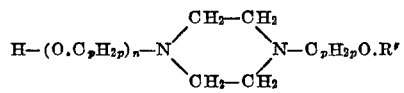

where R' is selected from the class consisting of short-chain alkyl and short-chain acyl radicals; n is a small whole number varying from 1 to 9; and p is a small whole number varying from 2 to 4, with (b) a member of the class consisting of carboxylic acids, their lower alkyl esters, their anhydrides and their acid halides, wherein the carboxylic acid radical has from 6 to 24 carbon atoms, and recovering the resulting high molecular weight ester.

5. A process for preparing surface-active compounds which comprises reacting (a) a compound having the following structural formula:

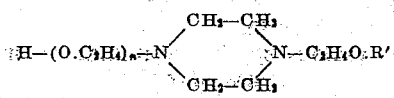

where R' is selected from the class consisting of short-chain alkyl and short-chain acyl radicals, the length of the short chain varying from 1 to 3 carbon atoms; and $n$ is a small whole number varying from 1 to 9, with (b) a member of the class consisting of carboxylic acids, their lower alkyl esters, their anhydrides and their acid halides, wherein the carboxylic acid radical has from 6 to 24 carbon atoms, and recovering the resulting high molecular weight ester.

6. A process for preparing surface-active compounds which comprises reacting (a) a compound having the following structural formula:

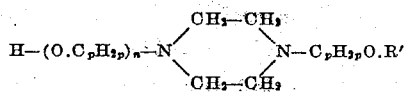

where R' is selected from the class consisting of short-chain alkyl and short-chain acyl radicals; $n$ is a small whole number varying from 1 to 9; and $p$ is a small whole number varying from 2 to 4, with (b) free alkali metal to form an alkoxide, and thereafter reacting the alkoxide with an alkyl halide having from 6 to 24 carbon atoms, and recovering the resulting high molecular weight ether.

7. A process for preparing surface-active compounds which comprises reacting (a) a compound having the following structural formula:

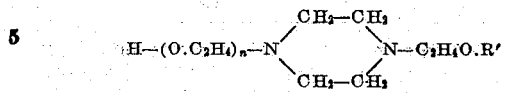

where R' is selected from the class consisting of short-chain alkyl and short-chain acyl radicals, the length of the short chain varying from 1 to 3 carbon atoms; and $n$ is a small whole number varying from 1 to 9, with (b) free alkali metal to form an alkoxide, and thereafter reacting the alkoxide with an alkyl halide having from 6 to 24 carbon atoms, and recovering the resulting high molecular weight ether.

8. A piperazine derivative as defined in claim 3 wherein the carbon atom content of X is 12.
9. A piperazine derivative as defined in claim 3 wherein the carbon atom content of X is 18.
10. A piperazine derivative as defined in claim 3 wherein the carbon atom content of X is 16.

JOHN DAVID MALKEMUS.
JOHN ROSS.

REFERENCES CITED

The following references are of record in the file of this patent:

UNITED STATES PATENTS

| Number | Name | Date |
|---|---|---|
| 2,302,388 | Hester | Nov. 17, 1942 |
| 2,421,707 | Malkemus | June 3, 1947 |